Patented Aug. 14, 1945

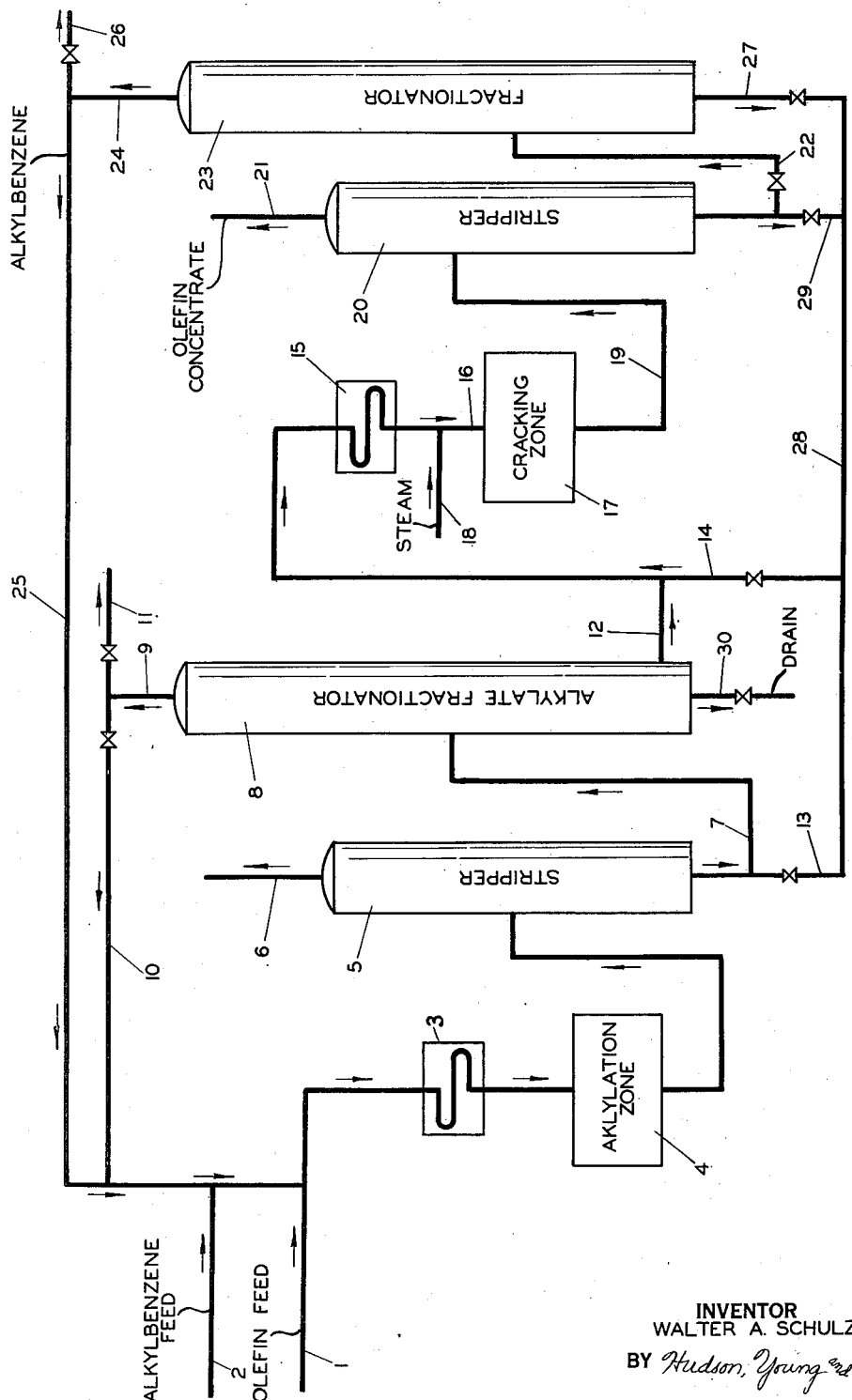

2,382,506

UNITED STATES PATENT OFFICE 2,382,506

OLEFIN RECOVERY PROCESS

Walter A. Schulze, Bartlesville, Okla., assignor to Phillips Petroleum Company, a corporation of Delaware Application October 5, 1942, Serial No. 460,849

5 Claims. (Cl. 260—677)

This invention relates to the treatment of hydrocarbon mixtures to separate and recover mono-olefinic components therefrom. More specifically the invention relates to the treatment of hydrocarbon fluids containing low-boiling olefins to effect selective removal of the olefins and recover said olefins in the form of more valuable concentrates. Still more specifically the invention relates to the interaction of olefins in paraffin-olefin mixtures with mono-alkyl benzenes to form poly-alkylated aromatics, and the catalytic cracking of said poly-alkylated aromatics to recover olefins in highly concentrated form.

It is an object of this invention to provide an improved process for the separation and recovery of olefins.

It is a further object of this invention to prepare olefin concentrates required for hydrocarbon syntheses and other olefin utilization processes.

Still another object of this invention is to provide an improved process for olefin recovery, generally applicable to olefin-containing mixtures from any source, whereby olefins are produced in concentrated form and uniform composition.

A still further object of this invention is to provide a process for the catalytic conversion of poly-alkylated benzenes and to recover valuable products of the conversion in a high state of purity.

A further object is to provide an improved process for alkylating an alkylbenzene with a low-boiling olefin.

The customary abundant sources of olefins of two to six or more carbon atoms are ordinarily highly complex mixtures of the paraffin and olefin isomers in varying proportions, depending on the nature of the hydrocarbon raw material, the reactions responsible for olefin production, and any subsequent processing steps. Thus, mixtures produced by dehydrogenation, cracking and similar convertive reactions may containing varying proportions of paraffins, normal olefins and isoolefins of the same or a different number of carbon atoms. Fractional distillation may provide a preliminary separation into narrow boiling-range fractions of compounds of the same number of carbon atoms, but even these narrow fractions of C₄ and higher hydrocarbons may contain several compounds with the olefins often present in minor amounts.

Various means of further concentrating the olefins include chemical separation and solvent extraction processes, making use of complex formation and preferential solubility or azeotropic distillation. Such processes vary in efficiency and are ordinarily characterized by high operating costs which have heretofore limited their application to special high-value products. In fact, although numerous technical and economic advantages may accrue to the use of olefins in high concentrations, the segregation methods have heretofore been so difficult and expensive as to favor the use of less desirable dilute stocks except where technically unfeasible.

In my copending application, Serial No. 460,846 filed of even date herewith, I have disclosed a novel and efficient process for the concentration and recovery of olefins in which the olefins are first reacted with benzene and converted to alkylbenzenes. These alkylbenzenes are then catalytically cracked to yield the original olefins in high purity, and aromatic compounds chiefly benzene, which is recycled to the first process step.

I have now discovered that the concentration and recovery of olefins may also be effected with certain advantages and modifications through the interaction of mono-alkyl benzenes hereinafter termed "alkylbenzenes" with olefins forming poly-alkyl benzenes. These latter compounds are then converted, preferably by means of catalysts in a cracking operation, to yield the original olefins in highly concentrated form. Other products of the cracking operation may be recovered and utilized as explained hereinafter.

The process of the present invention may be illustrated by the drawing which is a flow diagram of one possible arrangement of conventional equipment for specific operations as outlined below.

In the drawing, an olefin-containing feed entering by line 1 is mixed in controlled proportions with an alkylbenzene-containing feed from line 2, and the mixture passes through heat exchanger 3 which adjusts the temperature to alkylation conditions. The mixture then passes to alkylation zone 4 containing a suitable catalyst for alkylation of the benzene nucleus with the olefin present.

The alkylation products then pass to stripper 5 wherein unreacted components of the olefin feed may be removed through overhead line 6. The stripped alkylation products then pass through line 7 to alkylate fractionator 8 wherein a separation may be made between poly-alkyl benzenes formed in zone 4 and lower-boiling material which comprises unreacted excess alkylbenzene, other unreacted components of the alkylbenzene feed stream, or compounds originating in the cracking step as described below. Said lower-boiling material is taken overhead through line 9 and may be recycled to the alkylbenzene feed stream through line 10 or removed from the system by line 11. Poly-alkyl benzenes from the lower part of fractionator 8 may be taken as a fraction of selected boiling range through line 12 to the subsequent cracking step. Line 12 may be operated as a sidestream take-off whose location determines the boiling range of the liquid withdrawn.

Alternately, in some cases, depending on the alkylation feed composition, the alkylate fractionator may be by-passed and the total stripped alkylation product may then pass through lines 13 and 14, directly to the cracking step.

The poly-alkyl benzene feed to the cracking step is raised to the desired temperature in heater 15 and then passes through line 16 to cracking zone 17 containing a suitable solid adsorbent cracking catalyst. If desired, a diluent such as steam may be injected through line 18 into the heated vapors ahead of the cracking catalyst.

The cracked products pass through line 19 to column 20 wherein the olefins produced by the cracking reaction are taken overhead through line 21 to storage or utilization facilities (not shown). The liquid from the bottom of column 20 may then pass through line 22 to fractionator 23. In this fractionator a separation may be made between lower-boiling products such as benzene and/or alkyl benzenes and higher-boiling poly-alkyl benzenes unconverted in the cracking step. The lower-boiling fraction is taken overhead through line 24 and may be recycled directly to the alkylation step through line 25 or else withdrawn from the system through line 26 for other utilization.

The higher-boiling fraction comprising unconverted poly-alkyl benzenes may be taken through lines 27, 28 and 14 for another pass through the cracking step, or else taken through lines 27, 28, 13 and 7 for still further fractionation in alkylate fractionator 8. This latter additional fractionation may serve to separate alkylbenzenes for recycle and also to adjust the boiling range of the poly-alkyl benzenes to conform to the boiling range of the fresh feed to the cracking step. In this connection, traces of heavy refractory material may be removed from the system by drain 30.

Alternately, the fractionation indicated in column 23 may be wholly or partially omitted. Thus, the liquid products from column 20 may pass through lines 29, 28 and 14 for direct recycle to the cracking step, or the same stream may be taken through lines 29, 28, 13 and 7 for inclusion with the alkylated products ahead of alkylate fractionator 8.

In some cases, as will be pointed out, it may be desirable to recycle directly a portion of the liquid bottoms product from column 20 as indicated above and to fractionate the remainder of the stream in column 23 to remove compounds which are not allowed to build up in feed streams to either the alkylation or the cracking step. For example, a portion of the cracked products may be fractionated to remove benzene formed in the cracking step, before returning higher-boiling material to the system ahead of the alkylate fractionator.

The sequence of process steps and the auxiliary operations outlined in connection with the drawing will vary with the particular olefin being concentrated, and also with the particular alkylbenzene employed because the stability of the alkylbenzenes toward cracking decreases with increasing size of the alkyl group. Thus, while certain compounds such as toluene, xylene and ethylbenzene may be employed in the process with substantially no decomposition in the cracking step, isopropyl, the butyl and the amylbenzenes may undergo a varying amount of conversion to benzene with complete splitting off of the side-chains.

A convenient method for recovering relatively pure olefins comprises employing an alkylbenzene in the alkylation step with an alkyl group corresponding to the olefin being concentrated. For example, isopropylbenzene may be employed with propylene, sec-butylbenzene with the butylenes, etc. With this arrangement, the partial conversion of the poly-alkylated compounds to benzene produces an increased yield of the desired olefin without contamination.

When benzene is produced as described above, it may be recycled to the alkylation step for at least partial conversion to the alkylbenzene, or it may be removed by fractionation of the products from the cracking step. If there is an appreciable difference in the rate of alkylation of the benzene and that of the alkylbenzene, it may be desirable to perform such a fractionation on at least a portion of the stream of cracked products prior to recycling to maintain the benzene concentration at a suitable low level.

In contrast to the less stable alkylbenzenes, others such as toluene and ethylbenzene, for example, are less readily converted under the conditions ordinarily employed in the cracking step. These more stable compounds may be used in the concentration of olefins of three or more carbon atoms and recycled to the process steps through the alternate routes outlined in the drawing without the fractionation indicated in column 23.

However, the operations outlined in the drawing are adaptable to the separation and recovery in relatively pure form of alkylbenzenes which undergo substantially no conversion in the cracking step other than splitting off alkyl side chains added in the alkylation step. The operations which may be integrated for this last named feature are: (1) the fractionation of the alkylate in column 8 to separate unreacted components of the alkylbenzene feed stream, and (2) the fractionation in column 23 to separate substantially pure alkylbenzene overhead.

The operating conditions in the alkylation and cracking steps will usually vary with the particular olefin being concentrated, the original and final olefin concentrations, the nature of the alkyl benzene employed, and the catalysts used in each of the convertive reactions. Optimum conditions may be determined by experiment for specific circumstances in view of the accompanying general disclosure and the non-limiting exemplary operations provided. When using a silica-alumina alkylation catalyst, more fully identified below, I prefer to use temperatures ranging from about 250 to about 550° F. When using organic or inorganic complexes of boron trifluoride, as the alkylating catalyst, temperatures of substantially atmospheric or somewhat higher up to about 150° F. are preferred.

The alkylation treatment is preferably carried out in the presence of a catalyst active under mild temperature and pressure conditions, and which does not require extensive catalyst removal and/or hydrocarbon purification steps. While such conventional catalysts as sulfuric and phosphoric acids, aluminum chloride, zinc chloride, and the like, may be used, it is often desirable to employ a catalyst of the group comprising hydrofluoric acid, organic or inorganic complexes of boron trifluoride, or solid contact catalysts consisting of synthetic silica gel activated with alumina, zirconia or other metal oxides. These preferred catalysts may be employed so as to substantially completely strip olefins from even dilute feed streams with a minimum of sludge and polymer formation.

The olefin feed stock may be obtained from any suitable source such as petroleum cracking or dehydrogenation operations, and is often given preliminary fractionation to segregate olefins of the same number of carbon atoms. Mixtures of $C_3$ and $C_4$ or $C_4$ and $C_5$ olefins may, of course, be used but optimum alkylation conditions for each olefin may differ markedly so that process efficiency is decreased and the completeness of olefin removal may be affected.

The olefin-containing feed stocks to the present process are in many cases predominantly paraffin-olefin mixtures such as propane-propylene, butane-butylene or pentane-pentylene fractions produced by conventional fractional distillation or condensation methods. In some cases these stocks may also contain minor quantities of other components such as diolefinic or acetylenic compounds, which, for most applications of the present process, may be regarded as undesirable impurities. The extent of harmful effects of such impurities, and, hence, the amount which can be tolerated in process operations will depend on the catalysts employed and the extent to which they appear as contaminants in final olefin concentrates. If desirable, preliminary purification of the olefin-containing feed stock may be employed.

The olefin-containing feed is mixed with alkylbenzene feed in proportions favorable to satisfactory olefin reaction in the presence of the specific alkylation catalyst. In many cases a considerable excess of alkylbenzene is added to increase the proportion of dialkylbenzenes in the alkylate and/or to suppress polymerization of some of the more reactive olefins. Such polymerization is undesirable both because it represents possible loss of olefins and because the subsequent separation steps utilizing fractional distillation may be greatly complicated by the presence of the polymers. In most cases, sufficient alkylbenzene is added to represent an alkylbenzene-olefin molar ratio greater than about 1:1 and usually less than about 10:1.

The alkylbenzene-olefin molar ratios are often of greater importance when carrying out the alkylation step with butylenes, pentylenes, etc., over silica-alumina type catalysts under conditions conducive to olefin polymerization. Suppression of such polymerization is often accomplished by utilizing alkylbenzene-olefin molar ratios of about 3:1 or even higher. A further practical advantage of such feed mixture compositions is to reduce the tendency to form large proportions of poly-alkylated benzenes higher than about the dialkyl derivative which may be solids at relatively low temperatures or which are so high-boiling as to introduce difficulties in vaporization and in distillation. With many of the higher-boiling polyalkyl benzenes distillation in conventional apparatus will be greatly aided by vacuum operation.

The temperature and pressure of alkylation will depend on the catalyst employed, as will the flow rate or contact time of hydrocarbons with the catalyst. Where possible, the hydrocarbon stream is often maintained in liquid phase, although the low-boiling olefins may be added as gases to alkylbenzene liquid catalyst suspensions or passed in mixed phase with alkylbenzenes over solid catalysts.

In general, the alkylbenzenes are relatively more easily alkylated than benzene itself, or, with a given catalyst, under definite conditions, the extent of alkylation may be much more complete. This advantage from the use of alkylbenzenes in the alkylation step may be realized in several ways, such as employing milder alkylation conditions, higher flow rates of reactants or obtaining more complete olefin reaction. All of these modifications tend to increase efficiency in the alkylation step.

The reaction mixture from the alkylation zone may be stripped or fractionated to remove the hydrocarbons originally associated with the olefins, and this olefin-denuded stream may then be utilized elsewhere, as for example, for further conversion to olefins by catalytic dehydrogenation. The alkyl and poly-alkyl benzene mixture may then be fractionated to separate unreacted excess alkylbenzenes or non-aromatic impurities in the alkylbenzene feed. The precision of the fractionation and the separation effected will depend to a large extent on the associated operations and nature of the original alkylbenzene as outlined above in describing the process flow diagram. In any case, the alkylation products with or without fractionation comprise the feed to the cracking step.

The feed to the cracking zone, both fresh and recycle, is heated and vaporized in one or more steps to attain the proper temperature and the heated vapors are contacted with a catalyst which is highly specific in splitting off alkyl sidechains to produce the corresponding olefins. In this highly selective conversion, temperature, pressure, flow rate and other reaction conditions are carefully controlled to produce maximum yields of olefins and to suppress over-conversion and secondary reactions which destroy valuable products.

The reactions taking place in the cracking zone may be exemplified by the folowing equation:

$$C_6H_{6-x}-R_x \rightarrow C_6H_{6-x+y}-R_{x-y}+yR$$

where R represents an alkyl group of two to six or more carbon atoms, $x$ is the number of alkyl side-chains originally present and $y$ is the number of side-chains split off by the cracking reaction.

In the case of some of the less stable polyalkylated compounds with longer side chains this reaction may indicate step-wise removal of alkyl groups so that the products contain residues from the splitting off of one, two, or more alkyl groups. With di-secondary butylbenzene the equations are:

$$C_6H_4-(C_4H_9)_2 \rightarrow C_6H_5-C_4H_9+C_4H_8 \quad (a)$$
Di-sec-butylbenzene   Sec-butylbenzene+Butylene or $\quad C_6H_4-(C_4H_9)_2 \rightarrow C_4H_6+2C_4H_8 \quad (b)$
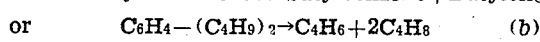
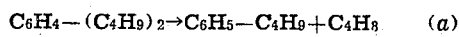
Benzene   Butylene With a compound containing different alkyl groups such as ethyl-sec-butylbenzene, substantially the sole reaction is:

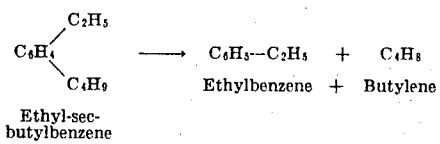

These equations show that the stability of the poly-alkyl benzenes, or, more specifically, the ease with which one or more alkyl side chains may be split off depends primarily on the number of carbon atoms in the side chain. Thus, under the conditions of the present process, $C_3$, $C_4$ and $C_5$ side-chains are relatively readily removed by catalytic cracking, while $C_1$ and $C_2$ side-chains are much more stable and are not ordinarily split off when present as the sole substituent on the benzene nucleus, or when another substituent on the nucleus is an alkyl group containing three or more carbon atoms.

A second factor influencing the stability of poly-alkyl benzenes in the cracking zone is the number of alkyl substituents on the aromatic nucleus. Considering this factor in the light of the comparative stabilities noted above for the various alkyl groupings, certain illustrations may be given. Thus, a dialkylbenzene is ordinarily more easily cracked than the corresponding monoalkylbenzene, or, under specific conditions, the conversion may be more complete. Thus, di-sec-butylbenzene may be converted principally to butylbenzene and butylene under conditions which give only minor conversion of sec-butylbenzene to benzene and butylene. In the case of dialkylbenzenes having different alkyl side-chains, the larger alkyl group is ordinarily split off under somewhat less severe conditions than are required for the same alkyl group when it is the sole substituent on the benzene nucleus.

These factors, together with their relative effects on the cracking reaction will be further illustrated in the exemplary operations to follow, and the process modifications and advantages resulting therefrom will be obvious in the light of this disclosure.

Temperatures in the cracking zone are ordinarily those which give a satisfactory rate of conversion over a specific catalyst with a minimum amount of secondary reactions which destroy desired products and/or reduce the efficiency of conversion. With the preferred catalysts these temperatures may be in the range of about 600 to about 1000° F., with a somewhat narrower range of about 700 to 900° F. usually preferred.

Pressures are ordinarily maintained at low levels to favor the cracking reaction and to suppress fragmentation, hydrogenation, polymerization and other reactions which may involve the olefins. In most cases, low, near-atmospheric pressures of about zero to about 50 pounds gage are satisfactory in maintaining suitable vapor flow rates through the cracking catalyst and auxiliary equipment. Sub-atmospheric pressures may be employed when warranted, as for example, with very high boiling feed stocks.

Flow rates are chosen to conform to temperature conditions to produce reasonable per pass conversions with high efficiency. Thus, within limits, higher temperatures may be used with high flow rates to increase conversion without increasing undesirable side reactions. Flow rates of about 1 to about 10 liquid volumes of hydrocarbon per volume of catalyst per hour are usually satisfactory.

While a number of conventional types of solid adsorbent cracking catalysts may be employed in the cracking zone, those most active and specific at moderate temperatures are certain silica-alumina compositions which may be considered the preferred catalysts. These catalysts are predominantly silica in highly adsorbent form activated with minor amounts of alumina. Other metal oxides such as zirconia and titania may also be present in small amounts along with the silica and alumina. Such catalysts are often synthetic preparations of the gel type formed by precipitation of the oxides as gels from suitable aqueous solutions by means known to the art, and carefully dried and activated to retain their structure and adsorbent characteristics.

Other types of silica-alumina catalysts may be prepared from naturally occurring minerals such as zeolites, clays, etc., by acid treatment to remove impurities and to adjust the silica-alumina ratio. Such preparations are usually less active for the present process and may require higher cracking temperatures. Certain natural clays of low iron content may be used with or without chemical treatment or activation, although their activity is lower than the preferred synthetic catalysts.

Bauxite, preferably of low iron content is active in a somewhat higher temperature range than the silica-alumina catalysts, and while satisfactorily specific in the primary splitting reaction, also promotes a degree of rearrangement and branching of the carbon skeleton in $C_4$ and higher olefins. This isomerization may be useful in cases where the production of isobutylene and other branched-chain olefins is advantageous. Synthetic alumina preparations require still higher cracking temperatures and may produce somewhat more cracking of the olefins to light gases.

It is desirable to operate the cracking step under reaction conditions least conducive to coke and carbon formation. This suppression of coking not only prolongs catalyst service between reactivations, but also reduces the production of hydrogen during cracking. This latter effect benefits olefin recovery by reducing possible hydrogenation of the olefins.

Coke formation and over-conversion, particularly at higher temperatures, often may be reduced by the addition of a substantially inert diluent to the hydrocarbon feed to the cracking zone. Such diluents should be relatively unconverted at reaction conditions and should also be readily separable from the reaction products to avoid contamination of olefin concentrates and recycle streams. A preferred diluent is steam which may be added at the proper temperature level ahead of or within the cracking zone and condensed and separated from the hydrocarbons in subsequent stages. The steam is beneficial as a heat carrier for the cracking reaction as well as a diluent in suppressing side reactions. Other possible diluents include nitrogen, carbon dioxide and methane.

When a cracking catalyst becomes deactivated during use, reactivation may be accomplished by conventional means such as burning off carbonaceous deposits with a gas stream of controlled low oxygen content. In reactivation of synthetic silica-alumina catalysts, temperatures of about 1000 to about 1200° F. are usually maintained, while with bauxite and clay-type minerals, somewhat higher temperatures up to about 1300° F. are permissible.

The following examples will illustrate certain embodiments of the process, particularly with regard to specific alkylation catalysts and conditions and specific cracking catalysts and conditions. Other modifications such as the products obtained from various alkylbenzenes will be apparent, as well as the sequence of process operations in producing certain desirable results. However, these examples are not to be considered as limitations since many other modifications and possible applications of the process will be evident in view of the scope and teachings of this disclosure.

Example 1

A C₄ fraction containing 23 volume per cent of normal butylenes was mixed with sec-butylbenzene to produce a feed mixture with an aromatic-olefin mol ratio of 4:1. This feed mixture was passed in liquid phase into a turboreactor containing liquid alkylation catalyst consisting of the complex of boron trifluoride and orthophosphoric acid. The hydrocarbons were in contact with the catalyst for 12 minutes at 90–100° F. and pressure sufficient to maintain liquid phase. The alkylation products were then separated from the catalyst and passed to a stripping zone where unreacted C₄ hydrocarbons were removed. The C₄ fraction contained less than one per cent butylenes.

The alkylate was then fractionated to separate sec-butylbenzene from poly-butyl benzenes utilizing vacuum to reduce the kettle temperature. The entire overhead product was returned to the alkylation zone.

The kettle product was essentially di-sec-butylbenzenes, and this was vaporized, diluted with steam to produce a steam-hydrocarbon molar ratio of 2.5:1 and the heated vapors passed at 750° F. and 5 pounds gage pressure over silica-alumina catalyst in the cracking zone. The cracked products were cooled and passed to a stripper for the removal of C₄ hydrocarbons. The liquid was then added to the alkylate stream ahead of the alkylate fractionator for separation of recycle di-sec-butylbenzenes from lower boiling products.

In the cracking zone approximately 90 weight per cent of the di-sec-butylbenzenes was converted per pass with recovered products approximately as follows:

| Compound | Mols/100 mols converted feed |
| --- | --- |
| Benzene | 27 |
| Sec-butylbenzene | 72 |
| C₄ hydrocarbons | 125 |

The normally gaseous hydrocarbon fraction contained 99 weight per cent of C₄ hydrocarbons including 95 weight per cent of butylenes.

The recycling of liquid cracked products to the alkylate fractionator permitted the recycle of the benzene formed in the cracking step to the alkylation step. However, this benzene was included as part of the alkylbenzene feed and was partially alkylated to sec-butylbenzene so that benzene did not pyramid in the system.

Example 2

The di-sec-butylbenzene stream of Example 1 was cracked over silica-alumina at 800° F. without steam diluent. In this case the per pass conversion was 96 weight per cent of the charge with recovered products approximately as follows:

| Compound | Mols/100 mols feed converted |
| --- | --- |
| Benzene | 49 |
| Sec-butylbenzene | 48 |
| C₄ hydrocarbons | 140 |

The normally gaseous hydrocarbon fraction contained about 98 weight per cent of C₄ hydrocarbons, including 93.5 weight per cent of butylenes. Under these more severe conditions, complete conversion of di-sec-butylbenzene to benzene was more pronounced, and recovery of butylenes was somewhat less.

Example 3

Isopropylbenzene was mixed with a C₃ fraction containing 56 mol per cent propylene in proportions to produce an aromatic-olefin molar ratio of 3:1. This feed mixture was passed in liquid phase over granular silica-alumina gel catalyst at 300° F., 400 pounds gage pressure and a flow rate of 2 liquid volumes per volume of catalyst per hour. The alkylation reaction products were stripped of C₃ hydrocarbons which were almost completely paraffinic.

Fractionation of the liquid alkylate separated isopropylbenzene and lower-boiling material overhead from the diisopropylbenzene. The heavy alkylate was vaporized, mixed with steam in a steam-hydrocarbon molar ratio of 3:1 and the mixture was passed at 750° F. and 5 pounds gage pressure over silica-alumina cracking catalyst at a flow rate of 1.5 liquid volumes per volume of catalyst per hour. The per pass conversion was about 55 weight per cent of the charge with recovered products approximately as follows:

| Compound | Mols/100 mols diisopropylbenzene converted |
| --- | --- |
| Benzene | 32 |
| Isopropylbenzene | 68 |
| C₃ hydrocarbons | 124 |

The C₃ fraction containing 94 weight per cent propylene was separated from the liquid cracked products. This liquid was then sent to a fractionator where benzene and material lower boiling than isopropylbenzene were separated from isopropylbenzene and recycle cracking stock. The bottoms from this fractionation were returned to the alkylate fractionator for separation of isopropylbenzene for recycle to the alkylation step while the diisopropylbenzene was recycled to the cracking step.

When bauxite or Attapulgus clay was substituted for silica-alumina in the cracking zone, the per pass conversion was somewhat lower, but propylene recovery was higher due to greatly reduced polymerization of the propylene.

Example 4

The C₄ feed of Example 1 was mixed with ethylbenzene in an aromatic-olefin molar ratio of 3:1 and the mixture was reacted in the presence of BF₃—H₃PO₄ catalyst at 90–100° F. and 50 pounds pressure to give substantially complete conversion of the butylenes. The alkylation products were stripped of C₄ paraffins, and the liquid alkylate was passed directly to the cracking step.

The vaporized feed to the cracking step was passed over silica-alumina cracking catalyst at 750° F., 5 pounds gage pressure and a flow rate of 1.5 liquid volumes per volume of catalyst per hour. The cracked products were first stripped of C₄ hydrocarbons, and then fractionated to separate ethylbenzene from unconverted ethylsec-butylbenzene. The former was returned to the alkylation step while the latter was recycled to the cracking step.

The per pass conversion in the cracking step was about 80 weight per cent of the poly-alkyl benzenes charged, and the recovered $C_4$ fraction contained 95 weight per cent of butylenes. The ethylbenzene was substantially unchanged during passage through the cracking zone.

I claim:

1. A process for the separation and recovery of low-boiling $C_3$ to $C_5$ aliphatic olefins from hydrocarbon mixtures containing a minor proportion of said olefins in admixture with a major proportion of close-boiling paraffins which comprises admixing said mixture with a mono-alkyl benzene in such proportions as to give a mono-alkyl benzene-olefin molar ratio greater than 1:1, treating the resulting mixture with an alkylation catalyst under such conditions that substantially all of the olefin content of said hydrocarbon mixture is reacted with said mono-alkyl benzene and converted to additional alkyl side chains on the benzene nucleus forming poly-alkylbenzenes while said paraffin is unaffected, substantially completely removing unreacted components of said hydrocarbon mixture and unreacted mono-alkyl benzene from the alkylation reaction products, treating the poly-alkyl benzenes so produced with a synthetic silica-alumina gel type cracking catalyst at temperatures of 600 to 1000° F. and under conditions such that dealkylation of said poly-alkylbenzenes to said mono-alkyl benzene and said olefins is the principal reaction occurring, recovering said olefins in concentrated form from the cracking effluent.

2. A process for the recovery of $C_3$ to $C_5$ aliphatic olefins from hydrocarbon mixtures containing a minor proportion of said olefins in admixture with a major proportion of close-boiling paraffins which comprises admixing said mixture with a mono-alkyl benzene in which the alkyl group corresponds to said olefin in such proportions as to give a mono-alkyl benzene-olefin molar ratio greater than 1:1, treating the resulting mixture with an alkylation catalyst under such conditions that substantially all of the olefin content of said hydrocarbon mixture is reacted with said mono-alkyl benzene and converted to additional alkyl side chains on the benzene nucleus forming poly-alkylbenzenes while said paraffin is unaffected, substantially completely removing unreacted components of said hydrocarbon mixture and unreacted mono-alkyl benzene from the alkylation reaction products, treating the poly-alkylbenzenes so produced with a synthetic silica-alumina gel type cracking catalyst at temperatures of 700 to 900° F. and under conditions such that dealkylation of said poly-alkylbenzenes to said mono-alkyl benzene and said olefins is the principal reaction occurring, substantially any other reaction being dealkylation of said poly-alkylbenzenes to benzene and said olefins, recovering said olefins in concentrated form from the cracking effluent, and returning mono-alkylbenzene to the alkylation step and unconverted poly-alkylbenzene to the cracking step.

3. A process for the recovery of butylene from a $C_4$ hydrocarbon mixture containing a minor proportion of butylene in admixture with a major proportion of butane which comprises admixing said mixture with mono-sec-butylbenzene in such proportions as to give a mono-sec-butylbenzene-butylene molar ratio of at least 3:1, treating the resulting mixture with an alkylation catalyst under such conditions that substantially all of the butylene content of said hydrocarbon mixture is reacted with said mono-sec-butylbenzene and converted to additional sec-butyl groups on the benzene nucleus forming poly-sec-butylbenzene while said butane is unaffected, removing unreacted components of said hydrocarbon mixture and unreacted mono-sec-butylbenzene from the alkylation reaction products, treating the poly-sec-butylbenzene so produced with a synthetic silica-alumina gel type catalyst at temperatures of 700 to 900° F. and under conditions such that dealkylation of said poly-sec-butyl benzene to mono-sec-butylbenzene and butylene is the principal reaction occurring, substantially any other reaction being dealkylation of said poly-sec-butylbenzene to benzene and butylene, recovering concentrated butylene from the cracking effluent, and returning mono-sec-butylbenzene to the alkylation step and poly-sec-butylbenzene to the cracking step.

4. A process for the separation and recovery of low-boiling $C_3$ to $C_5$ aliphatic olefins in concentrated form from hydrocarbon mixtures containing a minor proportion of said olefins in admixture with a major proportion of close-boiling paraffins which comprises admixing said hydrocarbon mixture with a mono-alkylbenzene in such proportions as to give a mono-alkyl benzene-olefin molar ratio greater than 1:1, treating the resulting mixture over a synthetic gel type catalyst comprising silica gel activated with a minor proportion of alumina at temperatures and pressures such that substantially all of the olefin content of said mixture is reacted with said mono-alkyl benzene and converted to additional alkyl side chains on the benzene nucleus forming poly-alkyl benzenes while said paraffin is unaffected, substantially completely separating unreacted components of said hydrocarbon mixture and unreacted mono-alkyl benzene from the alkylation reaction products, passing the poly-alkyl benzenes so produced over a cracking catalyst comprising a synthetic gel type catalyst which is predominantly silica in highly adsorbent form activated with minor amounts of alumina at temperatures in the range of 700 to 900° F. and pressures in the range of zero to 50 pounds gage whereby the poly-alkyl benzenes are dealkylated to said olefins and mono-alkylbenzene as the principal reaction products, recovering an olefin concentrate from the products of the cracking reaction, and returning mono-alkyl benzene to the alkylation step and unconverted poly-alkyl benzenes to the cracking step.

5. A process for the separation and recovery of butylene in concentrated form from hydrocarbon mixtures containing a minor proportion of said butylene in admixture with a major proportion of butane which comprises admixing said hydrocarbon mixture with mono-butylbenzene in such proportions as to give a mono-butylbenzene to butylene molar ratio greater than 1:1, treating the resulting mixture over a synthetic gel type catalyst comprising silica gel activated with a minor proportion of alumina at temperatures and pressures such that substantially all of the butylene content of said mixture is reacted with said mono-butylbenzene and converted to additional butyl side chains on the benzene nucleus forming poly-butylbenzenes while said butane is unaffected, substantially completely separating unreacted components of said hydrocarbon mixture and unreacted mono-butylbenzene from the alkylation reaction products, passing the poly-butylbenzenes so produced over a cracking catalyst comprising a synthetic gel type catalyst which is predominantly silica in highly adsorbent form activated with minor amounts of alumina at temperatures in the range of 700 to 900° F. and pressures in the range of zero to 50 pounds gage whereby the poly-butylbenzenes are dealkylated to butylene and mono-butylbenzene as the principal reaction products, recovering a butylene concentrate from the products of the cracking reaction, and returning mono-butylbenzene to the alkylation step and unconverted poly-butylbenzenes to the cracking step.

WALTER A. SCHULZE.